United States Patent
Lin et al.

(10) Patent No.: US 11,388,740 B2
(45) Date of Patent: Jul. 12, 2022

(54) METHOD AND APPARATUS FOR USING INDICATION INFORMATION OF TIME DOMAIN RESOURCE ALLOCATION

(71) Applicant: Telefonaktiebolaget LM Ericsson (publ), Stockholm (SE)

(72) Inventors: Zhipeng Lin, Nanjing (CN); Jianwei Zhang, Solna (SE); Robert Baldemair, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 406 days.

(21) Appl. No.: 16/478,654

(22) PCT Filed: May 10, 2019

(86) PCT No.: PCT/CN2019/086390
§ 371 (c)(1),
(2) Date: Jul. 17, 2019

(87) PCT Pub. No.: WO2019/214708
PCT Pub. Date: Nov. 14, 2019

(65) Prior Publication Data
US 2021/0368527 A1 Nov. 25, 2021

(30) Foreign Application Priority Data

May 11, 2018 (WO) ................ PCT/CN2018/086566

(51) Int. Cl.
*H04W 72/12* (2009.01)
*H04W 56/00* (2009.01)
(Continued)

(52) U.S. Cl.
CPC ..... *H04W 72/1273* (2013.01); *H04W 56/001* (2013.01); *H04W 68/005* (2013.01);
(Continued)

(58) Field of Classification Search
CPC .......... H04W 72/1273; H04W 56/001; H04W 68/005; H04W 72/0446; H04W 72/1289; H04W 74/0841
See application file for complete search history.

(56) References Cited

U.S. PATENT DOCUMENTS

2018/0192383 A1* 7/2018 Nam ................... H04W 72/042
2018/0324843 A1* 11/2018 Lee ........................ H04W 48/04
(Continued)

FOREIGN PATENT DOCUMENTS

| CN | 102316068 A | 1/2012 |
|----|-------------|--------|
| CN | 107018496 A | 8/2017 |

(Continued)

OTHER PUBLICATIONS

Chinese Office Action issued for Application No. 201980001303.6—dated Jan. 20, 2021.
(Continued)

*Primary Examiner* — Jael M Ulysse
(74) *Attorney, Agent, or Firm* — Baker Botts L.L.P.

(57) ABSTRACT

Various embodiments of the present disclosure provide a method for using indication information of time domain resource allocation. The method comprises receiving from a network node indication information of time domain resource allocation for a first type of message. The method further comprises determining a location of time domain resource for a first type of message based at least in part on the indication information and/or configuration information.

12 Claims, 11 Drawing Sheets

(51) Int. Cl.
*H04W 68/00* (2009.01)
*H04W 72/04* (2009.01)
*H04W 74/08* (2009.01)

(52) U.S. Cl.
CPC ... *H04W 72/0446* (2013.01); *H04W 72/1289* (2013.01); *H04W 74/0841* (2013.01)

(56) References Cited

U.S. PATENT DOCUMENTS

| | | | | |
|---|---|---|---|---|
| 2019/0104498 | A1* | 4/2019 | Jung | H04L 5/0053 |
| 2019/0150121 | A1* | 5/2019 | Abdoli | H04L 5/0053 370/329 |
| 2019/0159180 | A1* | 5/2019 | Ly | H04L 5/0048 |
| 2019/0200307 | A1* | 6/2019 | Si | H04L 5/0048 |
| 2019/0215124 | A1* | 7/2019 | Bendlin | H04L 27/2602 |
| 2019/0223084 | A1* | 7/2019 | John Wilson | H04L 5/0094 |
| 2019/0223163 | A1* | 7/2019 | Ko | H04L 27/26 |
| 2019/0261252 | A1* | 8/2019 | John | H04W 72/005 |
| 2019/0349885 | A1* | 11/2019 | Koskela | H04W 68/02 |
| 2019/0356524 | A1* | 11/2019 | Yi | H04B 7/0617 |
| 2020/0120642 | A1* | 4/2020 | Hwang | H04L 5/005 |
| 2020/0120680 | A1* | 4/2020 | Hwang | H04L 1/0071 |
| 2021/0014861 | A1* | 1/2021 | Wang | H04W 72/0446 |
| 2021/0037488 | A1* | 2/2021 | Ko | H04W 72/0453 |

FOREIGN PATENT DOCUMENTS

| | | |
|---|---|---|
| CN | 107889268 A | 4/2018 |
| CN | 108012329 A | 5/2018 |
| WO | 2014 023026 A1 | 2/2014 |
| WO | 2017210326 A1 | 12/2017 |
| WO | 2018062735 A1 | 4/2018 |

OTHER PUBLICATIONS

3GPP TSG-RAN WG1 Meeting #92bis; Sanya, People's Republic of China; Source: Nokia, Nokia Shanghai Bell; Title: Remaining issues on RMSI (R1-1805136)—Apr. 16-20, 2018.
3GPP TSG RAN WG1 Meeting #93; Busan, Korea; Source: Ericsson; Title: Remaining minimum system information (R1-1806421)—May 21-25, 2018.
PCT Notification of Transmittal of the International Search Report and the Written Opinion of the International Searching Authority, or the Declaration for International application No. PCT/CN2019/086390—dated Jul. 29, 2019.
3GPP TSG RAN WG1 Meeting #92bis; Sanya, China; Source: Ericsson; Title: Remaining minimum system information (R1-1805217)—Apr. 16-20, 2018.
Chinese Office Action issued for Application No. 201980001303.6—dated Oct. 12, 2020.
3GPP TSG-RAN WG1 meeting #92; Sanya, China; Source: Nokia, Nokia Shanghai Bell; Title: BWP determination for paging message delivery (R1-1805138)—Apr. 16-20, 2018.
3GPP TSG RAN WG1 Meeting #92bis; Sanya, China; Source: CATT; Title: Remaining Issues on PDSCH/PUSCH resource allocation (R1-1803757)—Apr. 16-20, 2018.
Extended European Search Report for Application No./Patent No. 19739189.9-1215 PCT/CN2019086390—dated Dec. 10, 2019.
Examination Report issued by the Government of India, Intellectual Property of India for Application No. 201947030685 dated Nov. 10, 2021.

\* cited by examiner

METHOD AND APPARATUS FOR USING INDICATION INFORMATION OF TIME DOMAIN RESOURCE ALLOCATION

PRIORITY

This nonprovisional application is a U.S. National Stage Filing under 35 U.S.C. § 371 of International Patent Application Serial No. PCT/CN2019/086390 filed May 10, 2019 and entitled "METHOD AND APPARATUS FOR USING INDICATION INFORMATION OF TIME DOMAIN RESOURCE ALLOCATION" which claims priority to International Patent Application No. PCT/CN2018/086566 filed May 11, 2018 both of which are hereby incorporated by reference in their entirety.

FIELD OF THE INVENTION

The present disclosure generally relates to communication networks, and more specifically, to usage on control information in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

With the rapid development of networking and communication technologies, a terminal device may be connected to different wireless communication networks, such as a long term evolution (LTE)/fourth generation (4G) network or a new radio (NR)/fifth generation (5G) network, to obtain multiple types of services. In order to connect to a network, a terminal device may need to acquire network synchronization and obtain essential system information (SI). For example, the terminal device can get SI in a master information block (MIB) and remaining minimum system information (RMSI). Synchronization signals may be used for adjusting the operating frequency of the terminal device relative to the network, and for finding proper timing of the received signal from the network. The radio resource and transmission configurations of the SI and synchronization signals may be informed to the terminal device by control information from the network. In addition, non-RMSI messages such as a paging message, a random access response (RAR) message, Msg4 of random access procedure and other system information (OSI) may also be informed to the terminal device by control information from the network.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to a first aspect of the present disclosure, there is provided a method implemented at a terminal device. The method comprises receiving from a network node indication information of time domain resource allocation for a first type of message. The method further comprises determining a location of time domain resource for a first type of message based at least in part on the indication information and/or configuration information.

According to a second aspect of the present disclosure, there is provided an apparatus implemented in a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus implemented in a terminal device. The apparatus comprises a receiving unit and a determining unit. In accordance with some exemplary embodiments, the receiving unit is operable to carry out at least the receiving step of the method according to the first aspect of the present disclosure. The determining unit is operable to carry out at least the determining step of the method according to the first aspect of the present disclosure.

According to a fifth aspect of the present disclosure, there is provided a method implemented at a network node. The method comprises determining indication information of time domain resource allocation for a first type of message. The method further comprises transmitting the indication information to the terminal device. According to some exemplary embodiments, a location of time domain resource for the first type of message is determined based at least in part on the indication information and/or configuration information.

According to a sixth aspect of the present disclosure, there is provided an apparatus implemented in a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus implemented in a network node. The apparatus comprises a determining unit and a transmitting unit. In accordance with some exemplary embodiments, the determining unit is operable to carry out at least the determining step of the method according to the fifth aspect of the present disclosure. The transmitting unit is operable to carry out at least the transmitting step of the method according to the fifth aspect of the present disclosure.

In accordance with an exemplary embodiment, the indication information is from a time domain resource allocation table specified for a second type of message, and the time domain resource allocation table is unchanged, or added one or more entries specified for the first type of message, or added one or more entries specified for the first type of message and deleted or updated one or more entries specified for the second type of message.

In accordance with an exemplary embodiment, the indication information is from a time domain resource allocation table specified for a first type of message.

In accordance with an exemplary embodiment, the time domain resource allocation table comprises at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

In accordance with an exemplary embodiment, the configuration information is predefined or received from the network node.

In accordance with an exemplary embodiment, the configuration information comprises a fixed and/or configurable and/or other-information-dependent offset.

In accordance with an exemplary embodiment, the fixed and/or configurable and/or other-information-dependent offset comprises orthogonal frequency division multiplexing, OFDM, symbol offset and/or slot offset and/or a time offset in other time unit.

In accordance with an exemplary embodiment, if the determined location of time domain resource by using the fixed and/or configurable and/or other-information-dependent offset is at least partially occupied, adding the fixed and/or configurable and/or other-information-dependent offset with a predefined value and determining the location of time domain resource for the first type of message based at least in part on the indication information and the added fixed and/or configurable and/or other-information-dependent offset.

In accordance with an exemplary embodiment, the configuration information is received in at least one of a high layer signaling, the downlink control information, a broadcast channel, and system information.

In accordance with an exemplary embodiment, the indication information is received as a part of downlink control information carried by a channel in a control resource set.

In accordance with an exemplary embodiment, the first type of message comprises at least one of a paging message, random access response, RAR, message, Msg4 of random access procedure, and other system information, OSI, and a unicast message, and the second type of message comprises a remaining minimum system information, RMSI, message.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

According to a seventeenth aspect of the present disclosure, there is provided a method implemented at a terminal device. The method comprises receiving from a network node indication information of time domain resource allocation for a non-remaining minimum system information, non-RMSI, message; and determining a location of time domain resource for the non-RMSI message based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is received as a part of downlink control information carried by a channel in a control resource set.

In an embodiment, the PDSCH time domain resource allocation table may be added one or more entries.

In an embodiment, the PDSCH time domain resource allocation table comprises at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

In an embodiment, the non-RMSI message comprises at least one of a paging message, random access response, RAR, message, Msg4 of random access procedure, and other system information. OSI, and a unicast message.

According to an eighteenth aspect of the present disclosure, there is provided an apparatus implemented in a terminal device. The apparatus comprises one or more processors; and one or more memories comprising computer program codes, the one or more memories and the computer program codes configured to, with the one or more processors, cause the apparatus at least to receive from a network node indication information of time domain resource allocation for a non-remaining minimum system information, non-RMSI, message; and determine a location of time domain resource for the non-RMSI message based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is received as a part of downlink control information carried by a channel in a control resource set.

According to a nineteenth aspect of the present disclosure, there is provided a method implemented at a network node. The method comprises determining indication information of time domain resource allocation for a non-remaining minimum system information, non-RMSI, message; and transmitting the indication information to the terminal device. A location of time domain resource for the non-RMSI message is determined based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is transmitted as a part of downlink control information carried by a channel in a control resource set.

In an embodiment, the PDSCH time domain resource allocation table is added one or more entries.

In an embodiment, the PDSCH time domain resource allocation table comprises at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

In an embodiment, the non-RMSI message comprises at least one of a paging message, random access response, RAR, message, Msg4 of random access procedure, and other system information, OSI, and a unicast message.

According to a twentieth aspect of the present disclosure, there is provided an apparatus implemented in a network node. The apparatus comprises one or more processors; and one or more memories comprising computer program codes, the one or more memories and the computer program codes configured to, with the one or more processors, cause the apparatus at least to determine indication information of time domain resource allocation for a non-remaining minimum system information, non-RMSI, message; and transmit the indication information to the terminal device. A location of time domain resource for the non-RMSI message is determined based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is transmitted as a part of downlink control information carried by a channel in a control resource set.

According to a twenty-first aspect of the present disclosure, there is provided a computer-readable medium having computer program codes embodied thereon for use with a computer, wherein the computer program codes comprise codes for performing the method according to the seventeenth aspect of the present disclosure.

According to a twenty-second aspect of the present disclosure, there is provided a computer-readable medium having computer program codes embodied thereon for use with a computer, wherein the computer program codes comprise codes for performing the method according to the nineteenth aspect of the present disclosure.

According to a twenty-third aspect of the present disclosure, there is provided an apparatus implemented in a terminal device. The apparatus comprises a receiving unit configured to receive from a network node indication information of time domain resource allocation for a non-remaining minimum system information, non-RMSI, message; and a determining unit configured to determine a location of time domain resource for the non-RMSI message based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is received as a part of downlink control information carried by a channel in a control resource set.

According to a twenty-fourth aspect of the present disclosure, there is provided an apparatus implemented in a network node. The apparatus comprises a determining unit configured to determine indication information of time domain resource allocation for a non-remaining minimum system information, non-RMSI, message; and a transmitting unit configured to transmit the indication information to the terminal device. A location of time domain resource for the non-RMSI message is determined based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is transmitted as a part of downlink control information carried by a channel in a control resource set.

The proposed solution according to one or more exemplary embodiments can enable a network node (such as a gNB) and a terminal device (such as a UE) to determine a location of time domain resource for a specific type of message based at least in part on the indication information and/or the configuration information. By applying the proposed solution according to the present disclosure, a more flexible time domain resource allocation can be realized.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
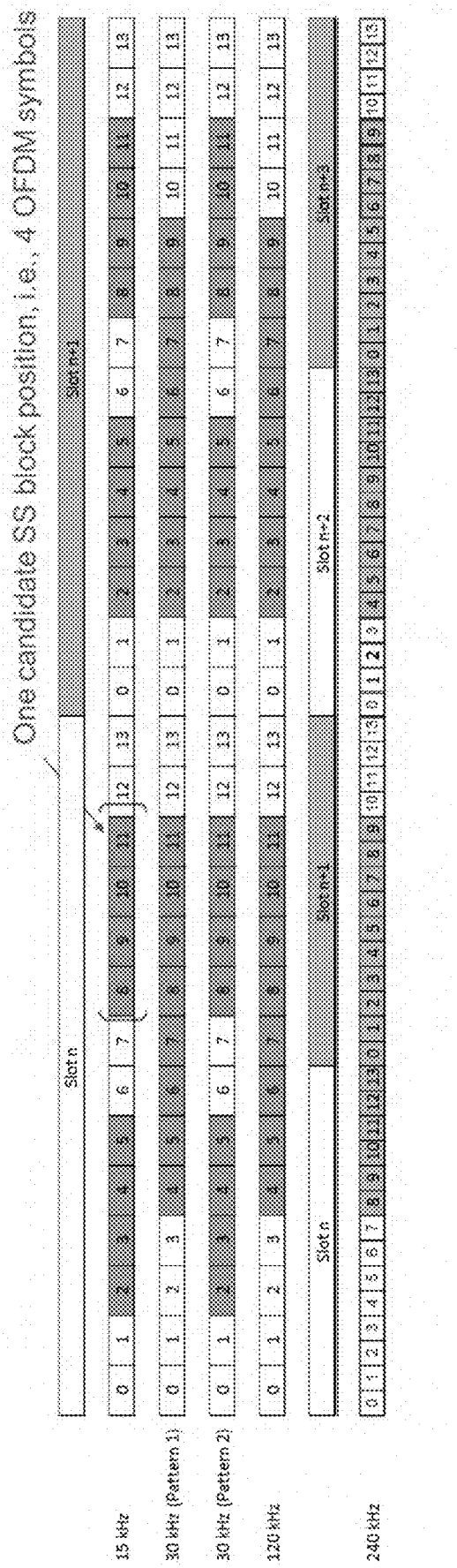
FIG. 1 is a diagram illustrating exemplary SSB mapping according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a wireless communication network, a terminal device may need to acquire network synchronization and obtain essential ST such as RMSI. In a wireless communication network such as NR, the synchronization and access procedure may involve several signals, for example, a primary synchronization signal (PSS) and a secondary synchronization signal (SSS).

The PSS may allow for network detection in the presence of a high initial frequency error, for example, up to tens of ppm. The SSS may allow for more accurate frequency adjustments and channel estimation while providing fundamental network information, such as a cell identifier (ID).

A physical broadcast channel (PBCH) may provide a subset of the minimum system information for random access and configurations for fetching remaining minimum system information in RMSI. It also may provide timing information within a cell, for example, to separate timing between beams transmitted from a cell. The amount of information to fit into the PBCH is of course highly limited to keep the size down. Furthermore, demodulation reference signals (DMRS) may be interleaved with PBCH resources in order to receive the PBCH properly.

A SS/PBCH block or SSB may comprise the above signals (such as PSS, SSS and DMRS) and PBCH. For example, the SSB may have 15 kHz, 30 kHz, 120 kHz or 240 kHz subcarrier spacing (SCS) depending on the frequency range.

FIG. 1 is a diagram illustrating exemplary SSB mapping according to some embodiments of the present disclosure. In FIG. 1, each numbered small box represents an orthogonal frequency division multiplexing (OFDM) symbol, and dark symbols represent the mapping of candidate SSB positions at which SSB may be transmitted. As illustrated in FIG. 1, one candidate SSB position may correspond to four OFDM symbols. FIG. 1A shows some exemplary candidate SSB positions within two slots for the cases of 15 kHz SCS, 30 kHz SCS (including pattern 1 and pattern 2) and 120 kHz SCS, and within four slots for the case of 240 kHz SCS.

According to an exemplary embodiment, a SS burst set may be transmitted periodically with the periodicity configured in RMSI. For example, 20 ms SS burst set periodicity may be assumed for initial access. By using the SSBs in the SS burst set, a UE can determine the downlink timing, frequency offset and/or the like, and acquire some fundamental system information from the PBCH. When the UE obtained downlink synchronization, it may know in which slots to expect SSB transmissions. Thus, the location of the SSB in a SS burst set may need to be provided to the UE to derive the subframe level synchronization.

In addition to network synchronization, some SI such as RMSI may also be important for a UE to connect to a network. RMSI may be carried in a physical downlink shared channel (PDSCH) scheduled by a physical downlink control channel (PDCCH) in the CORESET configured by a PBCH in NR. RMSI may contain the remaining subset of minimum system information, for example, the bitmap to indicate the actually transmitted SSBs.

The CORESET configured by the PBCH can also be used for other system information (OSI), paging, random access respond (RAR), and/or the like. In accordance with exemplary embodiments, the CORESET configured by the PBCH may consist of a number (denoted as $N_{RB}^{CORESET}$) of resource blocks in the frequency domain, and a number (denoted as $N_{symb}^{CORESET}$) of OFDM symbols in the time domain. For example, $N_{RB}^{CORESET}$ an may be 24, 48 or 96, and $N_{symb}^{CORESET}$ may be 1, 2 or 3.

After detecting one SSB, a UE may try to search the possible PDCCH candidates based at least in part on the CORESET configurations if they are present in the PBCH. In accordance with exemplary embodiments, there may be several possible multiplexing types between the SSB and the CORESET configured by PBCH (also known as RMSI CORESET).

Figure 2:
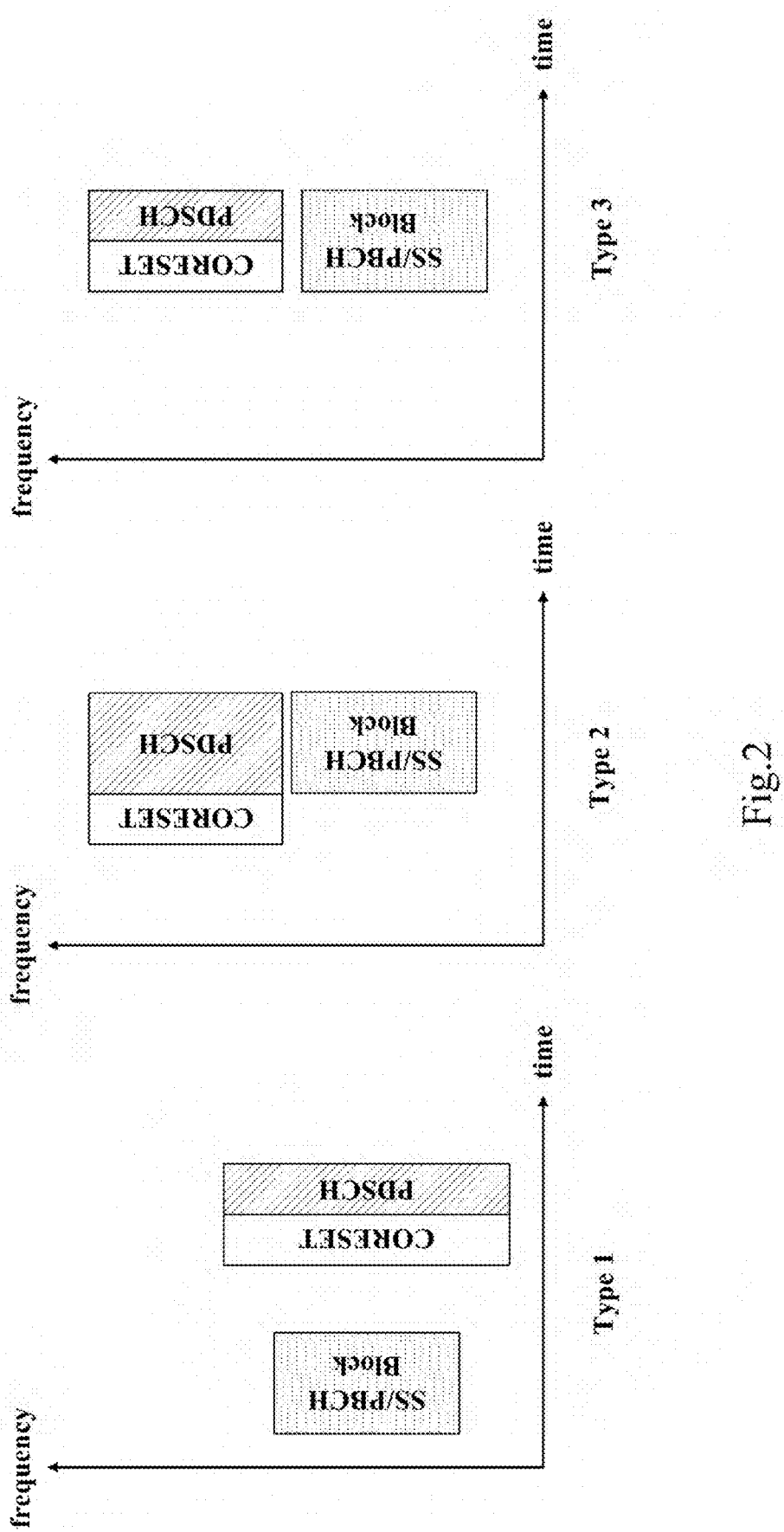
FIG. 2 is a diagram illustrating exemplary multiplexing types for SSB and RMSI CORESET according to some embodiments of the present disclosure.

FIG. 2 is a diagram illustrating exemplary multiplexing types for SSB and RMSI CORESET according to some embodiments of the present disclosure. As illustrated in FIG. 2, three multiplexing types (denoted as type 1, type 2 and type 3) may be applicable to the SSB and the RMSI CORESET in time domain and/or frequency domain. Among these multiplexing types, type 1 may be supported in sub-6 GHz and/or over-6 GHz frequency bands, while type 2 and type 3 are only supported in over-6 GHz frequency bands.

In accordance with exemplary embodiments, each multiplexing type may have a set of supported numerology combinations {SSB SCS, RMSI SCS}. For example, a set of numerology combinations {SSB SCS, RMSI SCS} supported by type 1 in sub-6 GHz frequency bands may comprise {15 kHz, 15 kHz}, {15 kHz, 30 kHz}, {30 kHz, 15 kHz} and {30 kHz, 30 kHz}, and a set of numerology combinations {SSB SCS, RMSI SCS} supported by type 1 in over-6 GHz frequency bands may comprise {120 kHz, 60 kHz}, {120 kHz, 120 kHz}, {240 kHz, 60 kHz} and (240 kHz, 120 kHz). Similarly, a set of numerology combinations {SSB SCS, RMSI SCS} supported by type 2 in over-6 GHz frequency bands may comprise {120 kHz, 60 kHz} and {240 kHz, 120 kHz}, and a set of numerology combinations {SSB SCS, RMSI SCS} supported by type 3 in over-6 GHz frequency bands may comprise {120 kHz, 120 kHz}.

FIG. 2 also shows the relationship between bandwidth of a PDSCH and bandwidth of the CORESET containing the PDCCH scheduling this PDSCH. According to an exemplary embodiment, the initial active downlink (DL) bandwidth part (BWP) may be defined as the frequency location and bandwidth of RMSI CORESET and the numerology of RMSI. The PDSCH delivering RMSI may be confined within the initial active DL BWP. A UE can learn specific resource configurations (such as time domain and/or frequency domain resource allocation) from downlink control information (DCI). The DCI may be used for scheduling RMSI, a paging message, random access response (RAR) message, Msg4 of random access procedure, and other system information (OSI), etc. For example, when the UE is scheduled to receive PDSCH by a DCI, the Time domain resource assignment field value m of the DCI provides a row index m+1 to an allocation table.

In 3GPP meeting RAN1 #92bis, below tables 5.1.2.1.1-1, 5.1.2.1.1-2, 5.1.2.1.1-3 and 5.1.2.1.1-4 have been agreed for time domain resource allocation of PDSCH carrying RMSI in case of type 1, type 2 and type 3 respectively. These tables are from a section of 5.1.2.1.13 of 3GPP TS 38.214, which is incorporated herein by reference in its entirety.

Table 5.1.2.1.1-1 defines which PDSCH time domain resource allocation configuration to apply. Either a default PDSCH time domain allocation A, B or C according to tables 5.1.2.1.1-2, 5.1.2.1.1-3 and 5.1.2.1.1-4 respectively is applied, or a high layer configured pdsch-AllocationList in either pdsch-ConfigCommon or pdsch-Config is applied.

TABLE 5.1.2.1.1-1

Applicable PDSCH time domain resource allocation

| RNT1 | PDCCH search space | SS/PBCH block and CORESET multiplexing pattern | pdsch-ConfigCommon includes pdsch-AllocationList | pdsch-Config includes pdsch-AllocationList | PDSCH time domain resource allocation to apply |
|---|---|---|---|---|---|
| SI-RNTI | Type0 common | 1 | — | — | Default A |
|  |  | 2 | — | — | Default B |
|  |  | 3 | — | — | Default C |
| RA-RNTI, TC-RNTI, C-RNTI | Type0A common Type1 common |  |  |  |  |
| P-RNTI | Type2 common |  |  |  |  |
| C-RNTI, CS-RNT1 | Type3 common |  |  |  |  |
| C-RNTI, CS-RNTI | UE specific | 1, 2, 3 | No | No | Default A |
|  |  | 1, 2, 3 | Yes | No | pdsch-AllocationList provided in pdsch-ConfigCommon |
|  |  | 1, 2, 3 | No/Yes | Yes | pdsch-Allocation List provided in pdsch-Config |

TABLE 5.1.2.1.1-2

Default PDSCH time domain resource allocation A

| Row index | dmrs-TypeA-Position | PDSCH mapping type | $K_0$ | S | L |
|---|---|---|---|---|---|
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 1 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 5.1.2.1.1-3

Default PDSCH time domain resource allocation B

| Row index | PDSCH mapping type | $K_0$ | S | L |
|---|---|---|---|---|
| 1 | Type B | 0 | 2 | 2 |
| 2 | Type B | 0 | 4 | 2 |
| 3 | Type B | 0 | 6 | 2 |
| 4 | Type B | 0 | 8 | 2 |
| 5 | Type B | 0 | 10 | 2 |
| 6 | Type B | 1 | 2 | 2 |
| 7 | Type B | 1 | 4 | 2 |

TABLE 5.1.2.1.1-4

Default PDSCH time domain resource allocation C

| Row index | PDSCH mapping type | $K_0$ | S | L |
|---|---|---|---|---|
| 1 | Type B | 0 | 4 | 2 |
| 2 | Type B | 0 | 6 | 2 |
| 3 | Type B | 0 | 8 | 2 |
| 4 | Type B | 0 | 10 | 2 |

Note that from a table size perspective, for default PDSCH time domain resource allocation B, it is possible to add 7 more rows with same $K_0$ and S as above but with L=4 as well as 2 more rows S=0 and L=4. For default PDSCH time domain resource allocation C, more entries can be added.

4 bits in DCI is used to indicate which time domain resource allocation table entry is used for the time domain resource allocation for PDSCH. In each entry, the parameter $K_0$ is the slot level offset from the slot including this DCI, the parameter S is the start symbol index (0 to 13) within a slot, and the parameter L is the number of OFDM symbols allocated.

In case the SSB and RMSI are multiplexed with type 2 and type 3, the agreed tables are only for RMSI scheduling. For non-RMSI messages such as the paging message, RAR message, Msg4 of random access procedure, OSI etc., some more flexible scheduling methods may be required when they're scheduled in CORESET configured by PBCH.

In the proposed solution according to some exemplary embodiments, a network node can provide a terminal device with indication information of time domain resource allocation for the non-RMSI message. In an embodiment, the above Table 5.1.2.1.1-2, 5.1.2.1.1-3 and 5.1.2.1.1-4 may be reused via introducing one or more entries and/or deleting one or more entries that is not often used to meet the maximum 16 entry requirement. In another embodiment, the above Table 5.1.2.1.1-2, 5.1.2.1.1-3 and 5.1.2.1.1-4 may be reused via introducing some additional fixed OFDM symbol level offset. In another embodiment, the above Table 5.1.2.1.1-2, 5.1.2.1.1-3 and 5.1.2.1.1-4 may be reused via introducing some additional configurable OFDM symbol level offset. The configurable OFDM symbol level offset can be signaled, e.g. in RMSI or PBCH. In another embodiment, the above Table 5.1.2.1.1-2, 5.1.2.1.1-3 and 5.1.2.1.1-4 may be reused and combined with other network configuration parameters provided either via a high layer signaling or DCI field to decide the PDSCH allocation. In another embodiment, a new table for non-RMSI PDSCHs may be defined. The new table may allow more flexible time domain OFDM symbol positions that are not limited with in the time duration of SSB and allow more slot level offset between PDCCH and PDSCH than the current table.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3:
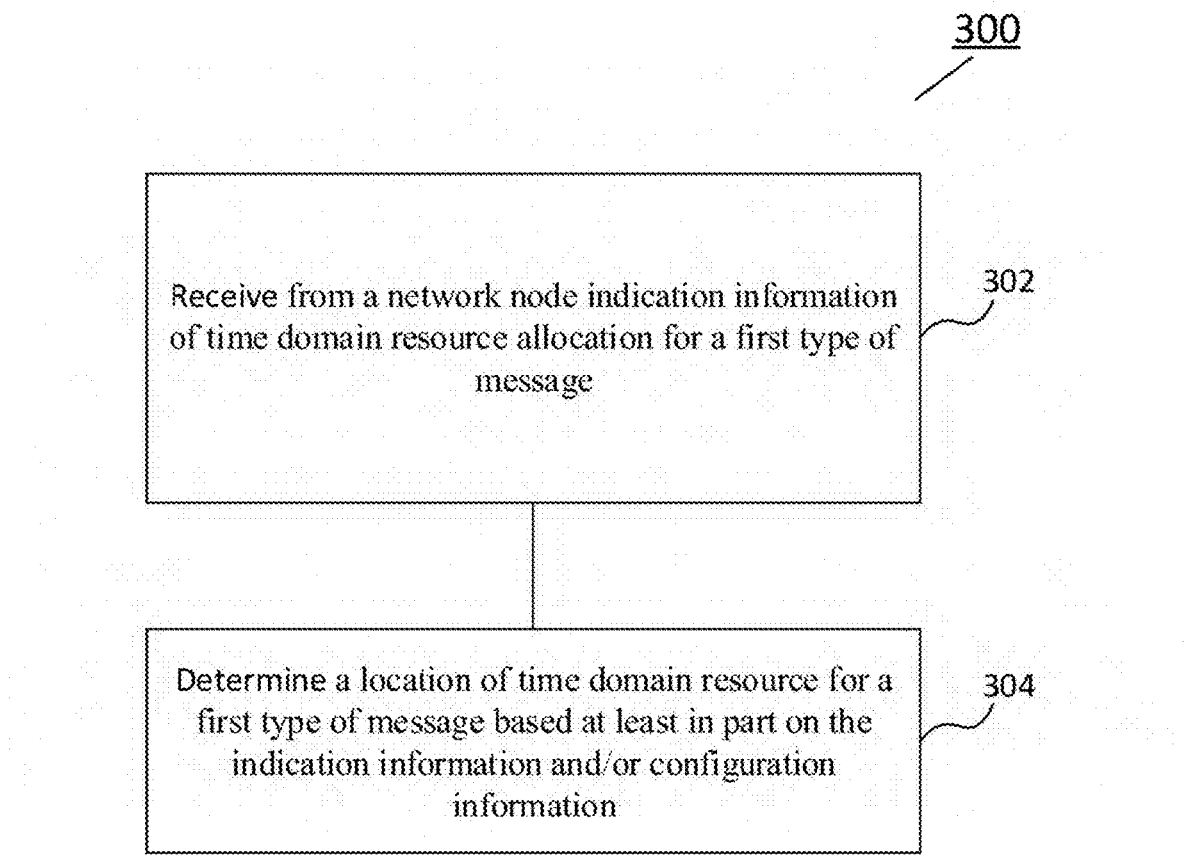
FIG. 3 is a flowchart illustrating a method according to some embodiments of the present disclosure.

FIG. 3 is a flowchart illustrating a method 300 according to some embodiments of the present disclosure. The method 300 illustrated in FIG. 3 may be performed by an apparatus implemented in a terminal device or communicatively coupled to a terminal device. In accordance with some exemplary embodiments, the terminal device such as a UE can support various multiplexing types between SSB and CORESET, for example, multiplexing type 1, type 2 and type 3 as shown in FIG. 2. The terminal device UE can know which time domain resource allocation table is currently used, for example, Table 5.1.2.1.1-2, 5.1.2.1.1-3, 5.1.2.1.1-4 or any other suitable time domain resource allocation tables. It will be appreciated that some embodiments of the present disclosure also may be applicable for other use cases, for example, multiplexing types between other different signal transmissions.

According to the exemplary method 300 illustrated in FIG. 3, the terminal device may receive from a network node indication information of time domain resource allocation for a first type of message as shown in block 302 and determine a location of time domain resource for a first type of message based at least in part on the indication information and/or configuration information, as shown in block 304.

In accordance with an exemplary embodiment, the indication information may be received as a part of DCI carried by a channel in a CORESET. The DCI may comprise DCI carried by a PDCCH in CORESET, or other proper type of DCI. For example, the DCI may have one or more fields containing various parameters, indicators, etc. The indication information may comprise one or more bits in a time domain resource allocation field of the DCI. It will be appreciated that the indication information may also be included in the DCI in other suitable forms. For example, the indication information in the time domain resource allocation field may form a new field of the DCI together with one or more bits in other field of the DCI.

In accordance with an exemplary embodiment, the configuration information may be predefined or received from the network node. For example, if the configuration information is predefined, the terminal device and the network device may prestore the configuration information. As another example, the network node may send the configuration information to the terminal device for example when configuration information is changed or updated. The configuration information may comprise any suitable information that can be used by the terminal device to determine the location of time domain resource for the first type of message. For example, the configuration information may indicate that the location of time domain resource for the first type of message is determined based on only the indication information. As another example, the configuration information may comprise offset information. In this case, the location of time domain resource for the first type of message may be determined based on the indication information and the offset information.

In accordance with an exemplary embodiment, the configuration information may comprise a fixed and/or configurable and/or other-information-dependent offset. The offset may refer to the offset of any suitable parameters indicated in the indication information. The offset may be determined by using various approaches, for example, based on time domain resource allocation of other messages. The other-information may be any suitable information such as 1) message types, corresponding to different RNTI types used for CRC (Cyclic Redundancy Check) scrambling of PDCCH scheduling the PDSCH, e.g. P-RNTI, 2) frequency band, 3) maximum number of beams used, 4) the paging occasion definition, etc. For example, the paging message that needs a larger slot offset can interpret the indication information with a predefined slot offset. There may be any other suitable other-information-dependent offset in other embodiments.

In accordance with an exemplary embodiment, the fixed and/or configurable and/or other-information-dependent offset may comprise OFDM symbols offset and/or slot offset and/or a time offset in other time unit. For example, the fixed or configurable offset may indicates that n symbol offset can be added to a start OFDM symbol indicated by the indication information. The fixed or configurable offset may indicates that m slot offset can be added to the slot indicated by the indication information.

In accordance with an exemplary embodiment, if the determined location of time domain resource by using the fixed and/or configurable and/or other-information-dependent offset is at least partially occupied, the fixed and/or configurable and/or other-information-dependent offset may be added with a predefined value and the location of time domain resource for the first type of message may be determined based at least in part on the indication information and the added fixed and/or configurable and/or other-information-dependent offset. The predefined value may be any suitable value that may be determined by using any suitable approaches, for example based on history information of the time domain resource allocation. It is noted that the above operation can be performed one or more times until the determined location of time domain resource is not occupied.

For example, for multiplexing pattern 3, the SSB and RMSI always have same subcarrier spacing, i.e. 120 kHz, for non-RMSI (such as the first type of message) PDSCH scheduling, n symbol offset can be added to the start symbol number S in Table 5.1.2.1.1-2, 5.1.2.1.1-3 and 5.1.2.1.1-4, and if the scheduled symbol (after the n symbol offset is added to S) overlaps with for example a further RMSI CORESET, the UE could assume that another n symbol offset to the S should be added to fetch the non-RMSI PDSCH.

Figure 4:
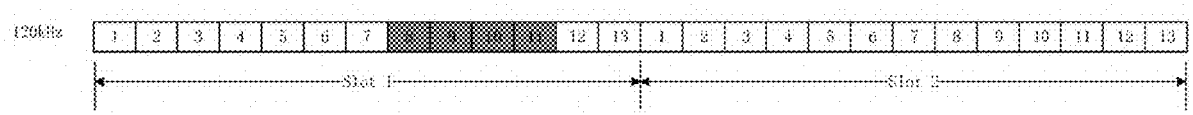
FIG. 4 is a diagram illustrating an example of using the fixed offset according to some embodiments of the present disclosure.

FIG. 4 is a diagram illustrating an example of using the fixed offset according to some embodiments of the present disclosure. As shown in FIG. 4, if one PDSCH is scheduled by DC in symbols 4 and 5 in the first slot (14 symbols each slot, 2 slots are shown in FIG. 4), and a row index is indicated in DCI as 2 in Table 5.1.2.1.1-4, i.e. the start symbol of PDSCH is 6 and length is 2. Then if it's a non-RMSI message (i.e. the PDCCH carrying the DCI is not scrambled by SI-RNTI), the fixed symbols offset such as 2 may be added to the S, i.e. S=8, length is 2, but this location may be the CORESET associated with the next SSB, so one additional offset of 2 symbols can be added, i.e. S=10 for non-RMSI scheduling.

In accordance with an exemplary embodiment, the configuration information may be received in at least one of a high layer signaling, the downlink control information, a broadcast channel, and system information. The high layer signaling may be layer 2 or above signaling, for example, radio resource control (RRC) signaling. The broadcast channel may be PBCH or other suitable broadcast channel. The system information may be RMSI or other suitable system information.

In accordance with an exemplary embodiment, the indication information is from a time domain resource allocation table specified for a second type of message and the time domain resource allocation table is unchanged, which may mean that the indication information is determined by the network node according to the time domain resource allocation table specified for the second type of message. The first type of message and the second type of message may be different. For example, the first type of message may comprise at least one of a paging message, RAR message, Msg4 of random access procedure, OSI, a unicast message, etc. The second type of message may comprise the RMSI message. For example, the time domain resource allocation table may be at least one of the Table 5.1.2.1.1-2, 5.1.2.1.1-3 and 5.1.2.1.1-4 or any other suitable table. The indication information may be the "Row index" of these tables. In this embodiment, the terminal device may determine the location of time domain resource for the first type of message based at least in part on the indication information and the configuration information as described above.

In accordance with an exemplary embodiment, the indication information is from a time domain resource allocation table specified for the second type of message, and the time domain resource allocation table is added one or more entries specified for the first type of message. For example, the Table 5.1.2.1.1-2, 5.1.2.1.1-3 and 5.1.2.1.1-4 may be reused via introducing one or more entries and/or deleting one or more the entries that is not often used to meet the maximum 16 entry requirement. As an example, for multiplexing type 2, Table 1 can be obtained based on the allowed OFDM symbol positions for non-RMSI PDSCH and with removal of some entries with odd numbered start symbol S, wherein row indexes 8-16 are added entries for the first type of message.

TABLE 1

| Row index | PDSCH mapping type | $K_0$ | S | L |
|---|---|---|---|---|
| 1 | Type B | 0 | 2 | 2 |
| 2 | Type B | 0 | 4 | 2 |
| 3 | Type B | 0 | 6 | 2 |
| 4 | Type B | 0 | 8 | 2 |
| 5 | Type B | 0 | 10 | 2 |
| 6 | Type B | 1 | 2 | 2 |
| 7 | Type B | 1 | 4 | 2 |
| 8 | Type B | 0 | 2 | 4 |
| 9 | Type B | 0 | 8 | 4 |
| 10 | Type B | 0 | 4 | 4 |
| 11 | Type B | 0 | 6 | 4 |
| 12 | Type B | 0 | 4 | 7 |
| 13 | Type B | 0 | 10 | 4 |
| 14 | Type B | 0 | 2 | 7 |
| 15 | Type B | 0 | 3 | 7 |
| 16 | Type B | 0 | 6 | 7 |

For multiplexing type 3, table 3 can be obtained as below, wherein row indexes 5-9 are added entries for the first type of message.

TABLE 2

| Row index | PDSCH mapping type | $K_0$ | S | L |
|---|---|---|---|---|
| 1 | Type B | 0 | 4 | 2 |
| 2 | Type B | 0 | 6 | 2 |
| 3 | Type B | 0 | 8 | 2 |
| 4 | Type B | 0 | 10 | 2 |
| 5 | Type B | 0 | 12 | 2 |
| 6 | Type B | 1 | 0 | 2 |
| 7 | Type B | 1 | 2 | 2 |
| 8 | Type B | 0 | 8 | 4 |
| 9 | Type B | 0 | 10 | 4 |

In accordance with an exemplary embodiment, the indication information is from a time domain resource allocation table specified for the first type of message. In this embodiment, the terminal device may determine a location of time domain resource for a first type of message based on the indication information. Alternatively, the terminal device may determine a location of time domain resource for a first type of message based on the indication information and the configuration information as described above.

In accordance with an exemplary embodiment, the time domain resource allocation table may comprise at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B as shown in the Table 5.1.2.1.1-2, 5.1.2.1.1-3 and 5.1.2.1.1-4, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

For example, a new default table for non-RMSI PDSCHs may not include all the rows for RMSI scheduling. Assuming CORESET and PDSCH in different slots are not supported for some non-RMSI PDSCH scheduling (alternatively: not supported for (some) unicast PDSCH scheduling), on top of which non-RMSI PDSCH reuses the RMSI entries when L=2, then some additional entries with odd numbered start symbol S may be removed to get Table 3 for non-RMSI PDSCH.

TABLE 3

| Row index | PDSCH mapping type | $K_0$ | S | L |
|---|---|---|---|---|
| 1 | Type B | 0 | 2 | 2 |
| 2 | Type B | 0 | 4 | 2 |
| 3 | Type B | 0 | 6 | 2 |
| 4 | Type B | 0 | 8 | 2 |
| 5 | Type B | 0 | 10 | 2 |
| 6 | Type B | 0 | 2 | 4 |
| 7 | Type B | 0 | 8 | 4 |
| 8 | Type B | 0 | 4 | 4 |
| 9 | Type B | 0 | 6 | 4 |
| 10 | Type B | 0 | 4 | 7 |
| 11 | Type B | 0 | 3 | 4 |
| 12 | Type B | 0 | 9 | 4 |
| 13 | Type B | 0 | 10 | 4 |
| 14 | Type B | 0 | 2 | 7 |

TABLE 3-continued

| Row index | PDSCH mapping type | $K_0$ | S | L |
|---|---|---|---|---|
| 15 | Type B | 0 | 3 | 7 |
| 16 | Type B | 0 | 6 | 7 |

It will be appreciated that Table 1-3 are just shown as examples and various alternative parameter settings may be applicable to the communication between the terminal device and the network node according to the embodiments of the present disclosure.

Figure 5:
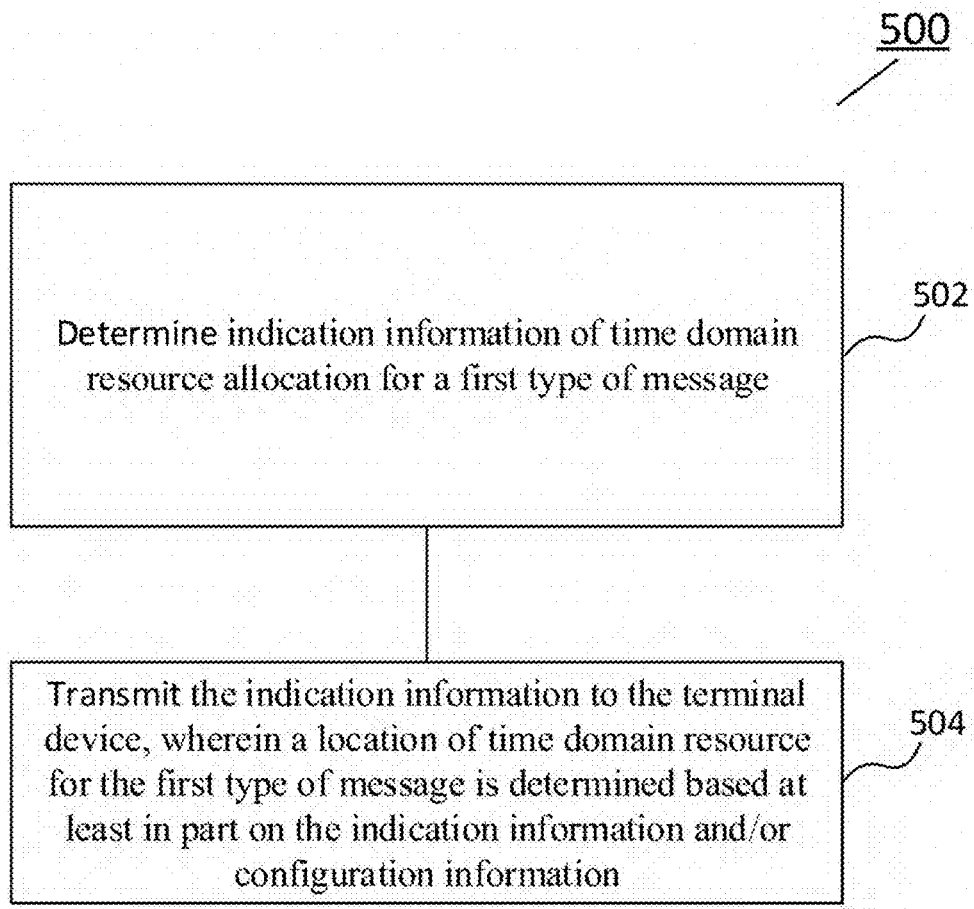
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by an apparatus implemented in a network node or communicatively coupled to a network node. In accordance with an exemplary embodiment, the network node such as a gNB can support various multiplexing types between SSB and CORESET, for example, multiplexing type 1, type 2 and type 3 as shown in FIG. 2. The network node can know which time domain resource allocation table may be selected to used, for example, Table 5.1.2.1.1-2, 5.1.2.1.1-3, 5.1.2.1.1-4 or any other suitable time domain resource allocation tables. Then the network node may determine indication information of time domain resource allocation for a specific type of message. It will be appreciated that some embodiments of the present disclosure also may be applicable for other use cases, for example, multiplexing types between other different signal transmissions. For some parts which have been described in the above embodiments, detailed description thereof is omitted here for brevity.

According to the exemplary method 500 illustrated in FIG. 5, the network node can determine indication information of time domain resource allocation for a first type of message as shown in block 502 and transmit the indication information to the terminal device as shown in block 504. In this embodiment, the location of time domain resource for the first type of message is determined based at least in part on the indication information and/or configuration information.

In accordance with an exemplary embodiment, the indication information is from a time domain resource allocation table specified for a second type of message, and the time domain resource allocation table is unchanged, or added one or more entries specified for the first type of message, or added one or more entries specified for the first type of message and deleted or updated one or more entries specified for the second type of message.

In accordance with an exemplary embodiment, the indication information is from a time domain resource allocation table specified for a first type of message.

In accordance with an exemplary embodiment, the time domain resource allocation table comprises at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B as shown in the Table 5.1.2.1.1-2, 5.1.2.1.1-3 and 5.1.2.1.1-4, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

In accordance with an exemplary embodiment, the configuration information is predefined or generated by the network node, and when the configuration information is generated by the network node, the method further comprises sending the configuration information to the terminal device.

In accordance with an exemplary embodiment, the configuration information comprises a fixed and/or configurable and/or other-information-dependent offset.

In accordance with an exemplary embodiment, the fixed and/or configurable and/or other-information-dependent offset comprises orthogonal frequency division multiplexing, OFDM, symbol offset and/or slot offset and/or a time offset in other time unit.

In accordance with an exemplary embodiment, if the determined location of time domain resource by using the fixed and/or configurable and/or other-information-dependent offset is at least partially occupied, the fixed and/or configurable and/or other-information-dependent offset is added with a predefined value and the location of time domain resource for the first type of message is determined based at least in part on the indication information and the added fixed and/or configurable and/or other-information-dependent offset.

In accordance with an exemplary embodiment, the configuration information is sent in at least one of a high layer signaling, the downlink control information, a broadcast channel, and system information.

In accordance with an exemplary embodiment, the indication information is sent as a part of downlink control information carried by a channel in a control resource set.

In accordance with an exemplary embodiment, the first type of message comprises at least one of a paging message, random access response, RAR, message, Msg4 of random access procedure, and other system information, OSI, and a unicast message, and the second type of message comprises a remaining minimum system information, RMSI, message.

It will be realized that parameters, variables and settings related to the time domain resource allocation described herein are just examples. Other suitable network settings, the associated configuration parameters and the specific values thereof may also be applicable to implement the proposed methods.

The proposed solution according to one or more exemplary embodiments can enable a network node (such as a gNB) and a terminal device (such as a UE) to determine a location of time domain resource for a specific type of message based at least in part on the indication information and/or the configuration information. By applying the proposed solution according to the present disclosure, a more flexible time domain resource allocation can be realized.

The various blocks shown in FIG. 3 and FIG. 5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
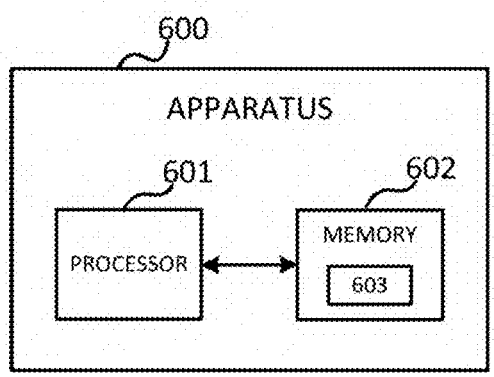
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a terminal device as described with respect to FIG. 3, or a network node as described with respect to FIG. 5.

In some implementations, the one or more memories 602 and the computer program codes 603 may be configured to, with the one or more processors 601, cause the apparatus 600 at least to perform any operation of the method as described in connection with FIG. 3. In other implementations, the one or more memories 602 and the computer program codes 603 may be configured to, with the one or more processors 601, cause the apparatus 600 at least to perform any operation of the method as described in connection with FIG. 5.

Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
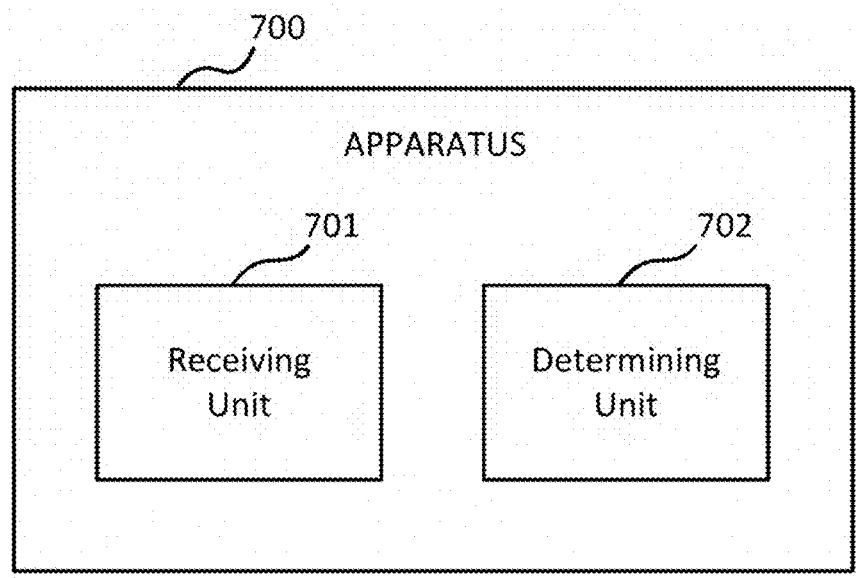
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a receiving unit 701 and a determining unit 702. In an exemplary embodiment, the apparatus 700 may be implemented in a terminal device such as a UE. The receiving unit 701 may be operable to carry out the operation in block 302, and the determining unit 702 may be operable to carry out the operation in block 304. Optionally, the receiving unit 701 and/or the determining unit 702 may be operable to carry out more or less operations to implement the proposed methods according to the exemplary embodiments of the present disclosure.

Figure 8:
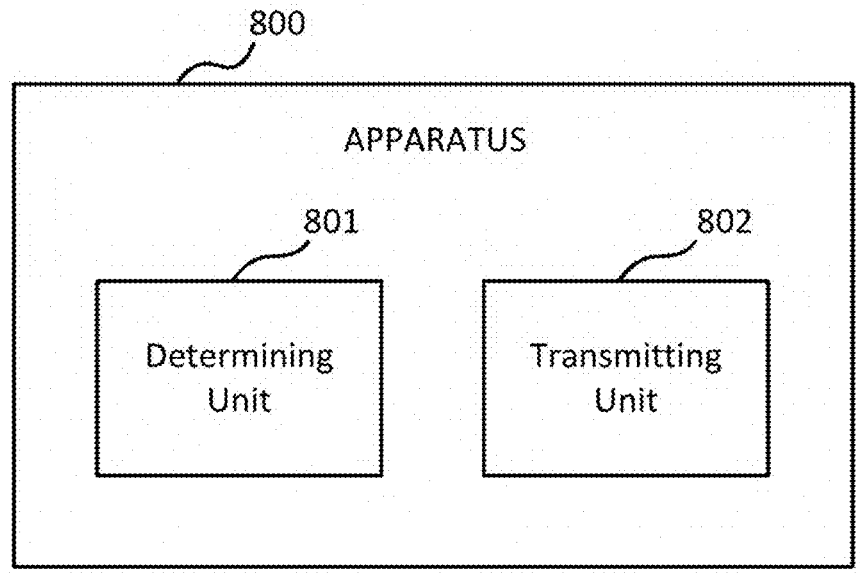
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a determining unit 801 and a transmitting unit 802. In an exemplary embodiment, the apparatus 800 may be implemented in a network node such as a gNB. The determining unit 801 may be operable to carry out the operation in block 502, and the transmitting unit 802 may be operable to carry out the operation in block 504. Optionally, the determining unit 801 and/or the transmitting unit 802 may be operable to carry out more or less operations to implement the proposed methods according to the exemplary embodiments of the present disclosure.

In an embodiment, there is provided a method implemented at a terminal device. The method comprises receiving from a network node indication information of time domain resource allocation for a non-remaining minimum system information, non-RMSI, message; and determining a location of time domain resource for the non-RMSI message based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is received as a part of downlink control information carried by a channel in a control resource set.

In an embodiment, the PDSCH time domain resource allocation table may be added one or more entries.

In an embodiment, the PDSCH time domain resource allocation table comprises at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

In an embodiment, the non-RMSI message comprises at least one of a paging message, random access response, RAR, message, Msg4 of random access procedure, and other system information, OSI, and a unicast message.

In an embodiment, there is provided an apparatus implemented in a terminal device. The apparatus comprises one or more processors; and one or more memories comprising computer program codes, the one or more memories and the computer program codes configured to, with the one or more processors, cause the apparatus at least to receive from a network node indication information of time domain resource allocation for a non-remaining minimum system information, non-RMSI, message; and determine a location of time domain resource for the non-RMSI message based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is received as a part of downlink control information carried by a channel in a control resource set.

In an embodiment, there is provided a method implemented at a network node. The method comprises determining indication information of time domain resource allocation for a non-remaining minimum system information, non-RMSI, message; and transmitting the indication information to the terminal device. A location of time domain resource for the non-RMSI message is determined based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is transmitted as a part of downlink control information carried by a channel in a control resource set.

In an embodiment, the PDSCH time domain resource allocation table is added one or more entries.

In an embodiment, the PDSCH time domain resource allocation table comprises at least one of the following parameters: physical downlink shared channel, PDSCH, mapping type, slot level offset, start symbol index and an allocated number of orthogonal frequency division multiplexing, OFDM, symbols, wherein the PDSCH mapping type comprises Type A and/or Type B, and/or the slot level offset comprises 0, 1 and/or integer greater than 1, and/or the start symbol index comprises at least one of the 0, 1, 2, 3, 4, 6, 8, 9, 10, 11, 12, and/or the allocated number of OFDM symbol comprises at least one of 2, 4, 7, and integer greater than 7.

In an embodiment, the non-RMSI message comprises at least one of a paging message, random access response, RAR, message, Msg4 of random access procedure, and other system information, OSI, and a unicast message.

In an embodiment, there is provided an apparatus implemented in a network node. The apparatus comprises one or more processors; and one or more memories comprising computer program codes, the one or more memories and the computer program codes configured to, with the one or more processors, cause the apparatus at least to determine indication information of time domain resource allocation for a non-remaining minimum system information, non-RMSI, message; and transmit the indication information to the terminal device. A location of time domain resource for the non-RMSI message is determined based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is transmitted as a part of downlink control information carried by a channel in a control resource set.

In an embodiment, there is provided a computer-readable medium having computer program codes embodied thereon for use with a computer, wherein the computer program codes comprise codes for performing the method related to the terminal device as described above.

In an embodiment, there is provided a computer-readable medium having computer program codes embodied thereon for use with a computer, wherein the computer program codes comprise codes for performing the method related to the network device as described above.

In an embodiment, there is provided an apparatus implemented in a terminal device. The apparatus comprises a receiving unit configured to receive from a network node indication information of time domain resource allocation for a non-remaining minimum system information, non-RMSI, message; and a determining unit configured to determine a location of time domain resource for the non-RMSI message based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is received as a part of downlink control information carried by a channel in a control resource set.

In an embodiment, there is provided an apparatus implemented in a network node. The apparatus comprises a determining unit configured to determine indication information of time domain resource allocation for a non-remaining minimum system information, non-RMSI, message; and a transmitting unit configured to transmit the indication information to the terminal device. A location of time domain resource for the non-RMSI message is determined based at least in part on the indication information. The indication information is from a physical downlink shared channel, PDSCH, time domain resource allocation table specified for a remaining minimum system information, RMSI, message. The PDSCH time domain resource allocation table is associated with synchronization signal/physical broadcast channel, SS/PBCH, block and control resource set, CORESET, multiplexing types 2 and 3, and the indication information is transmitted as a part of downlink control information carried by a channel in a control resource set.

Figure 9:
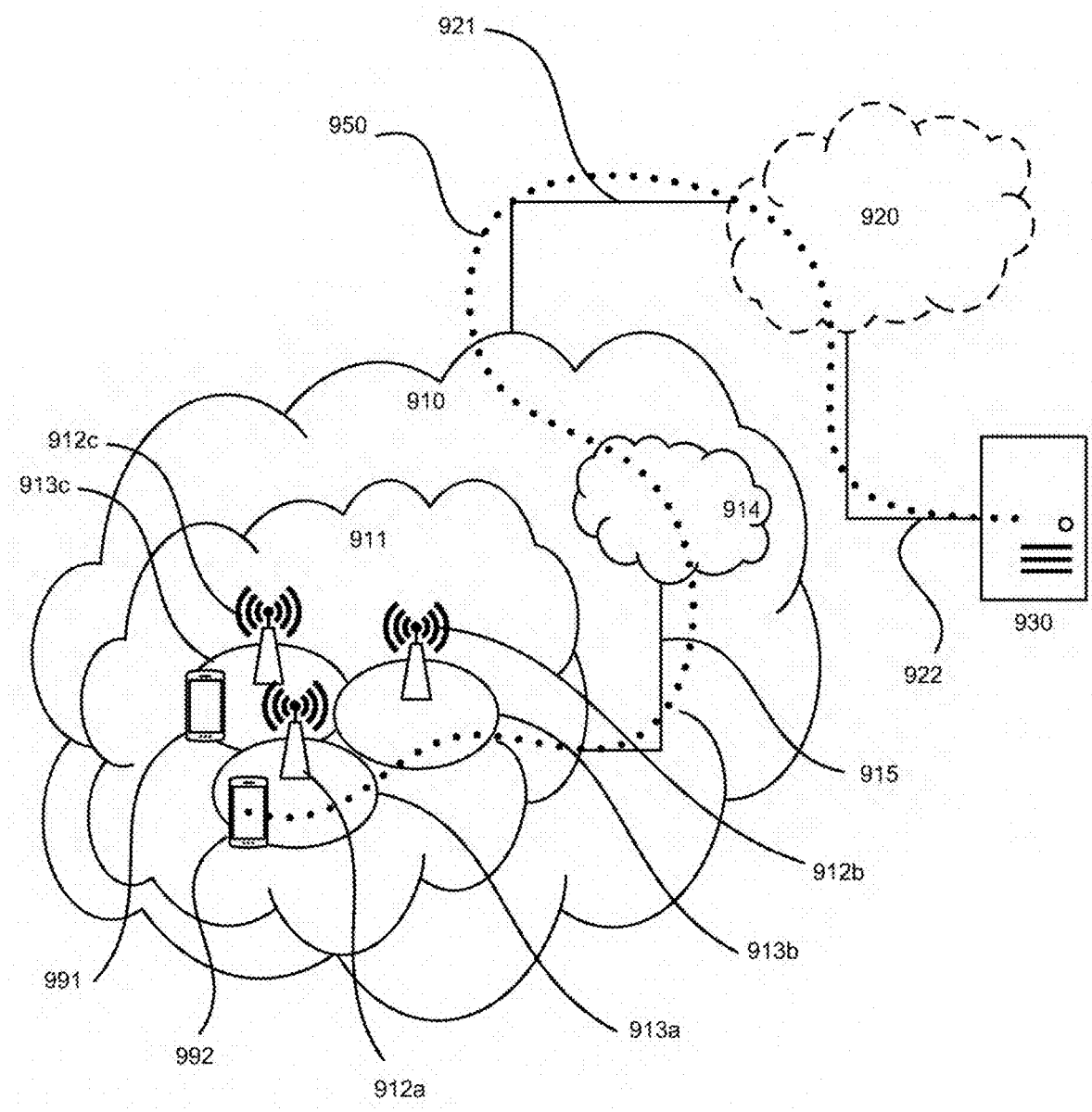
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
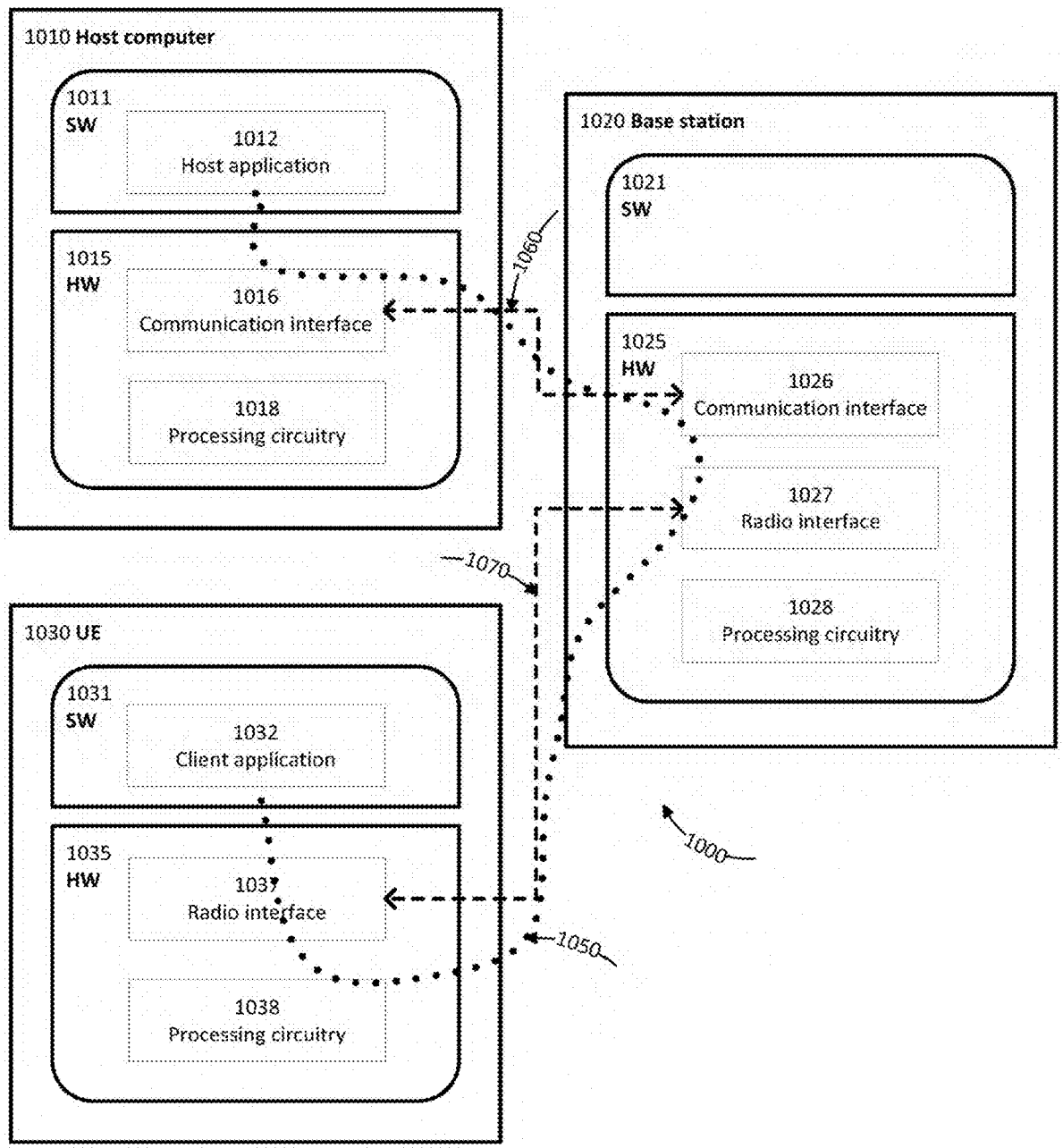
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
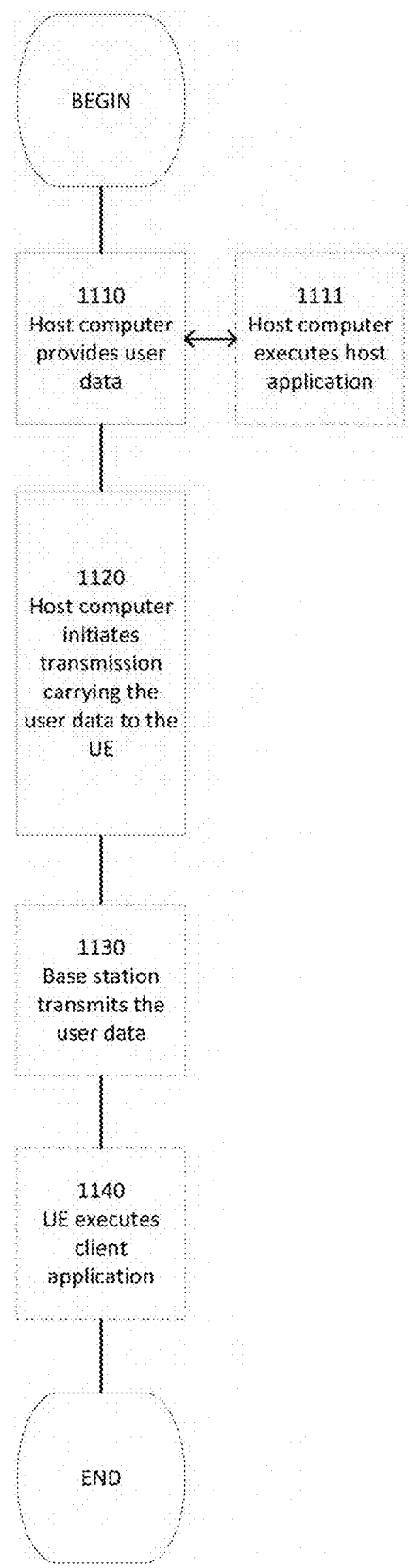
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
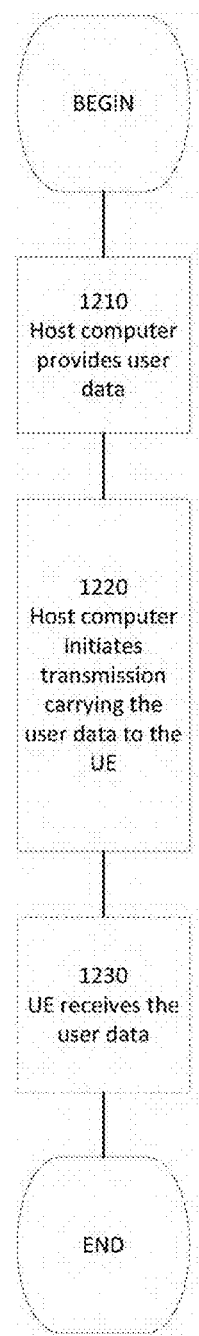
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
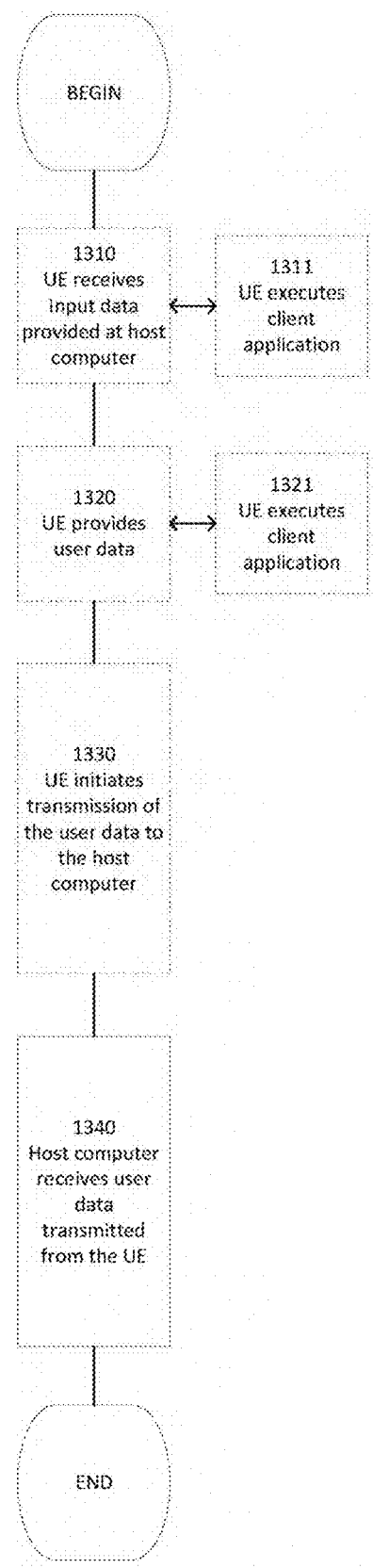
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
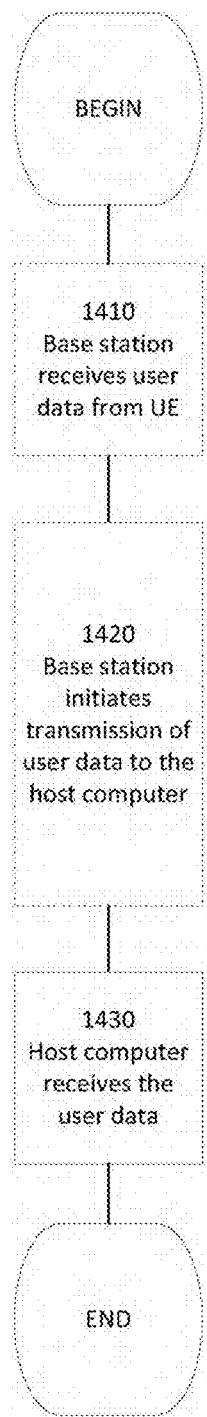
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a terminal device, comprising:
   receiving indication information from a network node, the indication information indicating a time domain resource allocation for a non-remaining minimum system information (non-RMSI) message; and
   determining a location of a time domain resource for the non-RMSI message based at least in part on the indication information;
   wherein the indication information is from a physical downlink shared channel (PDSCH) time domain resource allocation table specified for a remaining minimum system information (RMSI) message;
   wherein the PDSCH time domain resource allocation table is associated with synchronization signal/physical broadcast channel (SS/PBCH) block and control resource set (CORESET) multiplexing types 2 and 3, and the indication information is received as a part of downlink control information carried by a channel in a control resource set.

2. The method according to claim 1, wherein the PDSCH time domain resource allocation table comprises one or more entries specified for the RMSI message and one or more added entries, the one or more added entries specified for the non-RMSI message.

3. The method according to claim 1, wherein the PDSCH time domain resource allocation table comprises at least one of the following parameters:
   physical downlink shared channel (PDSCH) mapping type;
   slot level offset;
   start symbol index; and/or
   an allocated number of orthogonal frequency division multiplexing (OFDM) symbols;
   wherein:
   the PDSCH mapping type comprises Type A and/or Type B; and/or
   the slot level offset comprises 0, 1, and/or an integer greater than 1; and/or
   the start symbol index comprises at least one of 0, 1, 2, 3, 4, 6, 8, 9, 10, 11, 12; and/or
   the allocated number of OFDM symbol comprises at least one of 2, 4, 7, and an integer greater than 7.

4. The method according to claim 1, wherein the non-RMSI message comprises at least one of: a paging message, a random access response (RAR) message, a Msg4 of a random access procedure, other system information (OSI), and/or a unicast message.

5. An apparatus implemented in a terminal device, comprising:
   one or more processors; and
   one or more memories comprising computer program codes, the one or more memories and the computer program codes configured to, with the one or more processors, cause the apparatus at least to:
   receive indication information from a network node, the indication information indicating a time domain resource allocation for a non-remaining minimum system information (non-RMSI) message; and
   determine a location of a time domain resource for the non-RMSI message based at least in part on the indication information;

wherein the indication information is from a physical downlink shared channel (PDSCH) time domain resource allocation table specified for a remaining minimum system information (RMSI) message;

wherein the PDSCH time domain resource allocation table is associated with synchronization signal/physical broadcast channel (SS/PBCH) block and control resource set (CORESET) multiplexing types 2 and 3, and the indication information is received as a part of downlink control information carried by a channel in a control resource set.

6. The apparatus according to claim 5, wherein the PDSCH time domain resource allocation table comprises one or more entries specified for the RMSI message and one or more added entries, the one or more added entries specified for the non-RMSI message.

7. The apparatus according to claim 5, wherein the PDSCH time domain resource allocation table comprises at least one of the following parameters:
physical downlink shared channel (PDSCH) mapping type;
slot level offset;
start symbol index; and/or
an allocated number of orthogonal frequency division multiplexing (OFDM) symbols;
wherein:
the PDSCH mapping type comprises Type A and/or Type B; and/or
the slot level offset comprises 0, 1, and/or an integer greater than 1; and/or
the start symbol index comprises at least one of 0, 1, 2, 3, 4, 6, 8, 9, 10, 11, 12; and/or
the allocated number of OFDM symbol comprises at least one of 2, 4, 7, and an integer greater than 7.

8. The apparatus according to claim 5, wherein the non-RMSI message comprises at least one of: a paging message, a random access response (RAR) message, a Msg4 of a random access procedure, other system information (OSI), and/or a unicast message.

9. A method implemented at a network node, comprising:
determining indication information, the indication information indicating a time domain resource allocation for a non-remaining minimum system information (non-RMSI) message; and
transmitting the indication information to a terminal device;
wherein a location of a time domain resource for the non-RMSI message is determined based at least in part on the indication information;
wherein the indication information is from a physical downlink shared channel (PDSCH) time domain resource allocation table specified for a remaining minimum system information (RMSI) message;
wherein the PDSCH time domain resource allocation table is associated with synchronization signal/physical broadcast channel (SS/PBCH) block and control resource set (CORESET) multiplexing types 2 and 3, and the indication information is transmitted as a part of downlink control information carried by a channel in a control resource set.

10. The method according to claim 9, wherein the PDSCH time domain resource allocation table comprises one or more entries specified for the RMSI message and one or more added entries, the one or more added entries specified for the non-RMSI message.

11. The method according to claim 9, wherein the PDSCH time domain resource allocation table comprises at least one of the following parameters:
physical downlink shared channel (PDSCH) mapping type;
slot level offset;
start symbol index; and/or
an allocated number of orthogonal frequency division multiplexing (OFDM) symbols;
wherein:
the PDSCH mapping type comprises Type A and/or Type B; and/or
the slot level offset comprises 0, 1, and/or an integer greater than 1; and/or
the start symbol index comprises at least one of 0, 1, 2, 3, 4, 6, 8, 9, 10, 11, 12; and/or
the allocated number of OFDM symbol comprises at least one of 2, 4, 7, and an integer greater than 7.

12. The method according to claim 9, wherein the non-RMSI message comprises at least one of: a paging message, a random access response (RAR) message, a Msg4 of a random access procedure, other system information (OSI), and/or a unicast message.

* * * * *

UNITED STATES PATENT AND TRADEMARK OFFICE
CERTIFICATE OF CORRECTION

| | |
|---|---|
| PATENT NO. | : 11,388,740 B2 |
| APPLICATION NO. | : 16/478654 |
| DATED | : July 12, 2022 |
| INVENTOR(S) | : Lin et al. |

It is certified that error appears in the above-identified patent and that said Letters Patent is hereby corrected as shown below:

On the Title Page

On Page 2, item [56], under "OTHER PUBLICATIONS", in Column 2, Line 9, delete "application" and insert -- Application --, therefor.

In the Specification

Column 5, Line 22, delete "information." and insert -- information, --, therefor.

Column 9, Line 28, delete "narrow band" and insert -- narrowband --, therefor.

Column 9, Line 58, delete "ST" and insert -- SI --, therefor.

Column 10, Line 48, delete "respond" and insert -- response --, therefor.

Column 10, Line 53, delete "an may" and insert -- may --, therefor.

Column 11, Lines 41-42, delete "(240 kHz, 120 kHz)." and insert -- {240 kHz, 120 kHz}. --, therefor.

In Columns 11 & 12, under Table 5.1.2.1.1-1, Line 6, delete "RNT1" and insert -- RNTI --, therefor.

In Columns 11 & 12, under Table 5.1.2.1.1-1, Line 18, delete "CS-RNT1" and insert -- CS-RNTI --, therefor.

In Columns 11 & 12, under Table 5.1.2.1.1-1, Line 26, delete "Allocation List" and insert -- AllocationList --, therefor.

In Column 12, under Table 5.1.2.1.1-2, Line 11, delete "1" and insert -- 7 --, therefor.

Signed and Sealed this
Eleventh Day of October, 2022

Katherine Kelly Vidal
*Director of the United States Patent and Trademark Office*

In Column 15, Line 26, delete "indicates" and insert -- indicate --, therefor.

In Column 15, Line 28, delete "indicates" and insert -- indicate --, therefor.

In Column 15, Line 61, delete "DC" and insert -- DCI --, therefor.

In Column 18, Line 24, delete "used," and insert -- use, --, therefor.

In Column 26, Line 4, delete "host computer 1010's" and insert -- host computer's 1010 --, therefor.

In Column 26, Line 61, delete "substep 1330" and insert -- step 1330 --, therefor.